United States Patent [19]

Burkin

[11] 3,844,763
[45] Oct. 29, 1974

[54] DEPOSITION OF COPPER
[75] Inventor: Alfred Richard Burkin, Shenfield, England
[73] Assignee: National Research Development Corporation, London, England
[22] Filed: Aug. 20, 1971
[21] Appl. No.: 173,650

[30] Foreign Application Priority Data
  Aug. 28, 1970  Great Britain..................... 41659/70

[52] U.S. Cl..................... 75/0.5 A, 75/108, 75/117, 75/101 BE
[51] Int. Cl............................................. C22b 3/00
[58] Field of Search ..... 75/108, 117, 0.5 A, 101 BE

[56] References Cited
UNITED STATES PATENTS
3,353,950  11/1967  Junghanss............................. 75/0.5
3,532,490  10/1970  Burkin.............................. 75/108 X
3,669,650  6/1972  Elstein et al...................... 75/117 X

*Primary Examiner*—Herbert T. Carter
*Attorney, Agent, or Firm*—Finnegan, Henderson, Farabow and Garrett

[57] ABSTRACT

Copper powders or coatings are deposited by contacting with a reducing gas, e.g., hydrogen or carbonmonoxide, a liquid organic medium containing copper in a compound of or in association with at least one tertiary carboxylic acid having at least five carbon atoms to cause precipitation of copper from the organic phase, a base, preferably ammonia, being present in solution in the organic medium during precipitation.

11 Claims, No Drawings

DEPOSITION OF COPPER

This invention relates to the deposition of metal values and is particularly concerned with the deposition of copper.

In the recovery of metals from aqueous solutions derived by treatment of their ores or from wastes extensive use is now made of solvent extraction techniques in which the metal is extracted into a liquid phase containing an organic extractant. The metal is then recovered by contacting the liquid phase with a suitable aqueous stripping solution and recovering the metal from the resulting aqueous solution.

It has recently been found possible to produce metal powders in a more direct manner by reduction of the compound or complex of the metal and the organic extractant in the organic phase obtained as described above. According to this method which is described in British Patent Specification No. 1,215,574 a liquid organic medium containing a metal species in a compound of or in association with an organic extractant, e.g., a non-reducible carboxylic acid, is contacted with a reducing gas, e.g., hydrogen, to cause precipitation of a metal value from the organic phase. The liquid organic medium is generally provided by a suitable inert diluent, although in some cases an excess of the extractant may alternatively be employed.

A mixture of carboxylic acids, mainly comprising tertiary acids having from nine to eleven carbon atoms and denoted throughout the present specification by the term "$C_{9-11}$ tertiary acid," for example the mixture known commercially as "Versatic 9-11," is highly preferred as an organic extractant. Versatic 9-11 is a mixture of carboxylic acids having 9, 10 and 11 carbon atoms and containing secondary and tertiary acids in the ratio of about 10 percent to 90 percent. The $C_{9-11}$ tertiary acid is inexpensive and readily available and is relatively non-corrosive; it does not, for example, attack stainless steel under the conditions necessary for producing copper metal. It has the advantage of low volatility and low solubility in both water and alkaline liquors and in addition the cupric salt of, for example, Versatic 9-11 does not tend to crystallise out when an organic solution in a suitable diluent is allowed to stand at ambient temperatures.

In some circumstances, however, when the cupric salt of a tertiary acid containing more than 5 carbon atoms per molecule, e.g., Versatic 9-11, is reduced in the absence of a catalytically active surface such as is provided by a "seed" material, a high proportion of the available copper is produced in the form of a dark brown material which is believed to consist mainly of colloidal copper. By addition of colloidal carbon prior to reduction, as described in Example 8 of the aforementioned British Patent Specification No. 1,215,574, this disadvantage may be to some extent avoided but it has been found that significant amounts of the carbon seed remain as an impurity in the product and require subsequent removal.

It has now been found that a very high and in some cases an almost quantitative yield of copper powder is deposited in a filterable non-pyrophoric form from a solution containing copper in association with or in a compound of a suitable tertiary acid provided that there is present during reduction a base which is soluble in the organic medium, e.g., ammonia.

Accordingly, the present invention relates to a process for the production of a copper powder or coating which comprises contacting with a reducing gas e.g., hydrogen or carbon-monoxide, a liquid organic medium containing a copper species in a compound of or in association with at least one tertiary carboxylic acid having at least five carbon atoms, to cause precipitation of copper from the organic phase, there also being present during precipitation a base in solution in the organic medium.

The tertiary carboxylic acid having at least five carbon atoms is generally used in the form of a mixture of carboxylic acids containing mainly the required tertiary acids. A preferred such mixture is the $C_{9-11}$ tertiary acid referred to above, e.g., "Versatic 9-11," although other acids or mixtures of acids may be employed, for example those known commercially as "Versatic 9" "Versatic 10," "Versatic 11" and "versatic 16" which comprise respectively mainly $C_9$, $C_{10}$, $C_{11}$ and $C_{16}$ tertiary carboxylic acids.

The preferred base is ammonia although any other base which is soluble in the organic medium, for example an amine, can also be used. when ammonia is used, the solution preferably contains prior to reduction, about 2 gram moles of ammonia for each gram ion of copper in solution. The use of too great a quantity of ammonia may result undesirably in the formation of white crystals of the ammonium salt of the tertiary carboxylic acid which are usually removed after the reaction is completed.

As the yield of copper powder obtained is high, the addition of copper "seed" material is not normally necessary but such "seed" material may be used if so desired.

The reaction can be carried out in an autoclave at elevated temperature, preferably above 115°C, for example 140°C and is preferably carried out at elevated pressures above 100 p.s.i., for example, 300 p.s.i.

Some tertiary acids e.g., "Versatic 9-11," are liquid at the temperatures at which reduction is accomplished and may be used in excess to provide the liquid medium in which the process of the invention is carried out.

Alternatively other suitable liquid diluents may be employed, to provide a solution or dispersion, of the copper derivative and this method of operation is usually preferred. Such a diluent is preferably high-boiling and inert to the reducing gas employed, but in cases where a reducible diluent has other properties which makes its use desirable it may be used and subsequently dehydrogenated, for example, while being recycled. For practical convenience the vapour pressure of the diluent is preferably low at the working temperature, and its viscosity is preferably low at room temperature. The copper will usually be extracted into the organic phase from an aqueous solution and under these conditions the use of diluents having an unduly high water solubility will, of course, be avoided. Open chain hydrocarbons such as "Shellsol-T," cycloaliphatic hydrocarbons, aromatic hydrocarbons such as "Shellsol-AB," halogenohydrocarbons such as 1,2 dichloroethane and long chain alcohols may be used as diluents.

The organic phase may be produced in various ways. The simplest method is by extraction of the copper from an aqueous solution of an inorganic salt such as the sulphate, nitrate, nitrate or chloride into a solution of the extractant in the organic medium adjusting the pH as necessary.

A solution of the organic acid in a hydrocarbon as diluent can, for example, be equilibrated with an aqueous solution of an alkali such as sodium hydroxide, sodium carbonate or ammonia to form the sodium or ammonium salt of the acid. The organic solution of this salt in the diluent is then mixed with the aqueous solution of an inorganic salt of copper, and the addition of quite a small amount of additional alkali causes the copper to pass into the organic phase. It will be appreciated that the organic solution of the salt may be replaced by the solution remaining after reaction of the copper species with e.g., hydrogen in the presence of ammonia followed by recovery of the precipitated copper. This organic solution contains the ammonium salt of the acid which can react with a fresh aqueous solution of a copper salt in the presence of a small amount of additional alkali, to give a fresh organic solution of the copper species. By using this method, the amount of aqueous alkali required is reduced to a minimum and the acid is recycled, the process being repeated as many times as desired. Alternatively, an organic solution of the acid can be added to the aqueous solution of the inorganic copper salt, and the whole of the necessary amount of an aqueous solution of the alkali added to the mixture.

In some circumstances a precipitate of copper hydroxide may form or a layer of emulsion may be produced. The ratio of organic acid to inorganic salt and the quantity and nature of the alkali should be controlled so as to prevent this happening as far as possible.

When ammonia is used as the base it can conveniently be passed into the organic medium containing the copper species prepared as hereinbefore described until the appropriate increase in weight is obtained. It may alternatively be added to the autoclave.

When the process of the invention is used to produce copper powder this may be removed from the organic medium by filtration or preferably by centrifugation.

Table 1 shows results obtained from experiments in which the cupric salt of Versatic 9-11 was reduced (a) in the absence of any seed material or colloid destabiliser, (b) in the presence of copper seed material but in the absence of base, (c) in the presence of ammonia but in the absence of copper seed material and (d) in the presence of both ammonia and copper seed material.

Table 1

| Copper dissolved | $H_2$ used | Cu Seed | $NH_3$ used | Copper Formed |
|---|---|---|---|---|
| g. moles | g. moles | g. | g. | g. |
| (a) 0.475 | 0.463 | — | — | 2.6 |
| (b) 0.475 | 0.480 | 49.5 | — | 4.7 |
| (c) 0.475 | 0.452 | — | 8.0 | 29.4 |
| (d) 0.475 | 0.463 | 49.5 | 8.0 | 29.4 |

Column 1 gives the amount of copper present in solution as cupric salt of Versatic 9-11 initially, in g. moles, corresponding to 30.24g.

Column 2 gives the g. moles of hydrogen used during the reduction reaction. The presence or absence of ammonia makes no significant difference to this hydrogen uptake. Columns 3 and 4 show the amounts of copper seed and of ammonia present before heating was started. Column 5 shows the amount of copper metal deposited by reduction as determined by filtering the solution after reaction and measuring the amount of copper remaining in the organic liquid. The method used determined copper in all forms, including colloidal copper which passed through the filter. In those cases where no ammonia was used the reacted solutions were dark brown and on standing gave small amounts of copper as a plate on the surfaces of the glass containers. Samples of the filtered brown solutions were taken and allowed to oxidise in air, when they turned blue-green. The copper, then present entirely in the cupric state, was extracted into aqueous acid and the copper was determined by the conventional iodometric method using potassium iodate.

Instead of being filtered, the copper produced in the autoclave may be separated from the liquid by centrifuging. If a copper-containing liquid (33 percent Versatic 9-11 in Shellsol T) produced by reduction in the absence of ammonia is centrifuged only a trace of metal separates and the solution of Versatic 9-11 in Shellsol T remains dark brown in colour due to the colloidal solid remaining in suspension.

If the reduction is carried out in the presence of ammonia then when the suspension is centrifuged the metal product seperates rapidly. The liquid which is almost colourless, contains only the small amount of copper which was not reduced together with the very small amount which goes back into solution as the metal slowly redissolves in the Versatic 9-11 solution in the presence of oxygen (air). Thus measuring the copper content of the centrifugal liquid can be used to determine the efficiency of the reduction process and this is used in Table 2 to illustrate the effect of the amount of ammonia present on the process.

Table 2

| Case | Copper concentration (g/l) | | Molar ratio $NH_3$:Cu |
|---|---|---|---|
| | initial | final | |
| 1 | 20.01 | 0.20 | 0.1:1 |
| 2 | 24.01 | 0.17 | 0.5:1 |
| 3 | 23.52 | 0.18 | 1.0:1 |
| 4 | 23.52 | 0.32 | 2.0:1 |
| 5 | 23.67 | 1.61 | 2.5:1 |
| 6 | 31.36 | 0.24 | 2.1:1 |

The organic medium was 33% Versatic 9-11 in Shellsol T.

It is clear that a very small ammonia to copper ratio (0.1 to 1 or less) is sufficient to form easily removable metal.

As mentioned above when the amount of ammonia present is too high white crystals of the ammonium salt of the acid may form. This occured in cases 5 and 6 and is, of course, undesirable. In case 5 the initial copper concentration was about the same as in cases 1 to 4 but the ammonia to copper ratio was higher. The relatively high final copper concentration was caused by redissolution of some of the metal while the white crystals were being redissolved by warming in air. In case 6 the initial copper concentration was higher than in cases 1 to 5 so that the amount of ammonia required to give the 2.1:1 ratio was also higher. the white crystals were redissolved before centrifuging by warming under a nitrogen atmosphere and hence the final copper concentration was lower than in case 5.

Thus the effective upper limit upon the amount of base which may be used is set by the formation of crystals of the salt of the base and the tertiary carboxylic acid extractant.

The invention is illustrated by the following example:

A copper-containing organic liquid is prepared as follows. 1200 ml. of a mixture of 2 vols. of Shellsol T and 1 vol. of Versatic 9-11 is added to an aqueous solution of 250 g. of cupric sulphate, $CuSO_4.5H_2O$, made up to 1 litre in water and the mixture is stirred vigorously. A 1 molar solution of sodium hydroxide is added slowly so as to produce only a small amount of basic cupric sulphate or cupric hydroxide, which redissolves in the organic acid solution. Addition of the alkali is continued until the precipitate will not dissolve after stirring for 15 minutes without adding more alkali, and the stirring is then discontinued. The organic liquid is separated from the aqueous phase and stored. Fresh Versatic 9-11 Shellsol T is added to the residual aqueous cupric sulphate solution, the mixture is stirred, and alkali added until practically all of the copper has been removed from the aqueous phase, which is then removed and replaced by fresh cupric sulphate solution. The sequence of extraction is continued until 6 litres of Shellsol T - Versatic 9-11 solution loaded with copper is obtained. The solution contains 25.2 g of copper per litre.

1200 ml. of the copper-containing liquid is taken and ammonia gas is passed into the liquid until the desired increase in weight (8.0g.) has been obtained.

The liquid is put into a 2 litre autoclave, copper powder is added as seed where appropriate and the vessel is sealed. The autoclave is flushed with nitrogen and the pressure released through a valve which is then re-sealed. The temperature is taken to 140°C, the stirrer is turned on at 1,000 rpm and when the temperature has stabilised at 140°C hydrogen is admitted to about 300 psi. 0.452 g. moles hydrogen are taken up. A recorder is used to give a trace of the initial pressure, the pressure drop during reaction and the final value. When the reacted solution is cold it is removed from the autoclave and filtered under vacuum. The clear solution is removed and the copper powder washed with acetone, dried and weighed. 29.49 g. copper is deposited from a solution which initially contains 0.475 g. moles copper as the cupric salt of Versatic 9-11.

What I claim is:

1. Process for precipitating copper comprising contacting with a reducing gas a liquid organic medium containing a copper species in a compound of or in a complex with at least one tertiary carboxylic acid having at least 5 carbon atoms to cause precipitation of copper from said organic phase, there being present during said precipitation a base in solution in said organic medium.

2. Process according to claim 1 in which said reducing gas is hydrogen.

3. Process according to claim 1 in which said reducing gas is carbon monoxide.

4. Process according to claim 1 in which said at least one tertiary carboxylic acid having at least 5 carbon atoms is a mixture of carboxylic acids which consists of acids having 9, 10 and 11 carbon atoms and containing secondary and tertiary acids in the ratio of about 10 percent to 90 percent.

5. Process according to claim 1 in which said base is ammonia.

6. Process according to claim 1 in which said liquid organic medium comprises said at least one tertiary carboxylic acid having at least 5 carbon atoms in an organic diluent selected from the group consisting of open chain hydrocarbons, cycloaliphatic hydrocarbons, aromatic hydrocarbons, halogenohydrocarbons and long chain alcohols.

7. Process according to claim 1 in which copper powder is separated from said liquid organic medium by filtration.

8. Process according to claim 1 in which copper powder is separated from said liquid organic medium by centrifuging.

9. Process for producing a copper powder comprising contacting with a reducing gas a liquid organic medium containing a copper species in a compound of or in a complex with at least one tertiary carboxylic acid having at least 5 carbon atoms to cause precipitation of copper from said organic phase, there being present during said precipitation ammonia in an amount such that the molar ratio $NH_3:Cu$ is less than about 2.0 in solution in said organic medium.

10. Process according to claim 9 in which said liquid organic medium comprises a mixture of carboxylic acids containing mainly tertiary carboxylic acids having at least 5 carbon atoms in admixture with an organic diluent.

11. Process according to claim 9 in which said contacting with a reducing gas takes place at elevated temperature and elevated pressure.

* * * * *